(12) United States Patent
Finch et al.

(10) Patent No.: US 11,463,168 B2
(45) Date of Patent: Oct. 4, 2022

(54) MULTI-APERTURE FREE-SPACE OPTICAL COMMUNICATIONS RECEIVER

(71) Applicant: BAE SYSTEMS plc, London (GB)

(72) Inventors: Stephen Derek Finch, Chelmsford (GB); Michael Stewart Griffith, Chelmsford (GB); Andrew James Williams, Chelmsford (GB)

(73) Assignee: BAE SYSTEMS plc, London (GB)

( * ) Notice: Subject to any disclaimer, the term of this patent is extended or adjusted under 35 U.S.C. 154(b) by 0 days.

(21) Appl. No.: 17/415,984

(22) PCT Filed: Dec. 10, 2019

(86) PCT No.: PCT/GB2019/053486
§ 371 (c)(1),
(2) Date: Jun. 18, 2021

(87) PCT Pub. No.: WO2020/128432
PCT Pub. Date: Jun. 25, 2020

(65) Prior Publication Data
US 2022/0077929 A1 Mar. 10, 2022

(30) Foreign Application Priority Data

Dec. 20, 2018 (EP) ..................................... 18275188
Dec. 20, 2018 (GB) ..................................... 1820774

(51) Int. Cl.
*H04B 10/00* (2013.01)
*H04B 10/118* (2013.01)
*H04B 10/112* (2013.01)

(52) U.S. Cl.
CPC ......... *H04B 10/118* (2013.01); *H04B 10/112* (2013.01)

(58) Field of Classification Search
CPC . H04B 10/118; H04B 10/112; H04B 10/1121; H04B 10/1123; H04B 10/1125;
(Continued)

(56) References Cited

U.S. PATENT DOCUMENTS

| 10,003,402 B2 | 6/2018 | Boroson et al. |
| 2003/0067657 A1* | 4/2003 | Dimmler ............ H04B 7/18506 398/129 |

(Continued)

FOREIGN PATENT DOCUMENTS

| CN | 107040316 A | 8/2017 |
| EP | 2015125 A1 | 1/2009 |

(Continued)

OTHER PUBLICATIONS

International Preliminary Report on Patentability received for PCT Application No. PCT/GB2019/053486. dated Jul. 1, 2021. 9 pages.

(Continued)

*Primary Examiner* — Hanh Phan
(74) *Attorney, Agent, or Firm* — Finch & Maloney PLLC

(57) ABSTRACT

A multi-aperture free-space optical communications receiver comprises a plurality of telescopes each having a clear objective aperture with a diameter between 50 mm and 250 mm and arranged for receiving light collectively from an optical communications light source. A coherent combiner unit is configured for coherently combining the collectively received light to produce a combined optical signal therewith. Each telescope is arranged in association with, respectively, a wavefront detector to determine a wavefront of said received light directed to it by the respective telescope, a steerable reflector unit including a deformable mirror controllable to deform according to said determined wavefront such that said received light is reflected by the deformable mirror with a modified wavefront, and an optical (Continued)

signal receiver comprising a single-mode optical fibre. The steerable reflector unit is steerable to input received light with modified wavefront into the single-mode optical fibre for reception by the optical signal receiver.

18 Claims, 5 Drawing Sheets

(58) Field of Classification Search
CPC .............. H04B 10/1127; H04B 10/114; H04B 10/1143; H04B 10/1149; H04B 10/40; H04B 10/616; H04B 10/611
USPC ....... 398/118, 119, 120, 121, 122, 123, 124, 398/125, 126, 127, 128, 129, 130, 131, 398/135, 136, 158, 159, 202, 204, 205, 398/208, 209, 210
See application file for complete search history.

(56) References Cited

U.S. PATENT DOCUMENTS

| | | | |
|---|---|---|---|
| 2014/0126902 A1* | 5/2014 | Swanson | H04J 14/04 398/43 |
| 2015/0301321 A1* | 10/2015 | Graves | G02B 17/0888 398/118 |
| 2017/0264365 A1 | 9/2017 | Takahashi et al. | |
| 2020/0044737 A1* | 2/2020 | Arikawa | H04B 10/65 |
| 2021/0083779 A1 | 3/2021 | Arikawa et al. | |

FOREIGN PATENT DOCUMENTS

| | | |
|---|---|---|
| WO | 2010058193 A2 | 5/2010 |
| WO | 2018139357 A1 | 8/2018 |
| WO | 2018198891 A1 | 11/2018 |
| WO | 2018180912 A1 | 2/2020 |
| WO | 2020128432 A1 | 6/2020 |

OTHER PUBLICATIONS

International Search Report and Written Opinion received for PCT Application No. PCT/GB2019/053486. dated Feb. 25, 2020. 35 pages.
GB Search Report under Section 17(5) received for GB Application No. 1820774.6, dated Jun. 10, 2019. 5 pages.
EP Extended European Search Report received for EP Application No. 18275188.3, dated Jun. 27, 2019. 30 pages.
Boulet, et al., "Development of a Small Aperture Bimorph Deformable Mirror for a Free-Space Optical Communications System," Proc. SPIE, vol. 7833, Unmanned/Unattended Sensors and Sensor Networks VII,, 78330D, Oct. 28, 2010. 9 pages.
Geisler, et al., "Multi-aperture digital coherent combining for free-space optical communication receivers," Optics Express, vol. 24., No. 12, Jun. 1, 2016. pp. 12661-12671.
Geisler, et al., "Experimental demonstration of multi-aperture digital coherent combining over a 3.2-km free-space ink," Proc. SPIE 10096, Free-Space Laser Communications and Atmospheric Propagation XXIX, vol. 100960C, Feb. 24, 2017. 9 pages.
Griffith,et al., "Dual-use bimorph deformable mirrors," Proc. SPIE vol. 5989, Technologies for Optical Countermeasures II; Femtosecond Phenomena II; and Passive Millimetre-Wave & Terahertz Imagining II, 598906, Nov. 3, 2005. 9 pages.
Griffith,et al., Progress on the development of a zonal bimorph deformable mirror, Proc SPIE vol. 7015, Adaptive Optics System, 70153L, Jul. 14, 2008. 12 pages.
Juarez, et al., "Evaluation of Curvature Adaptive Optics for Airborne Laser Communication Systems," Proc SPIE vol. 10770, Laser Communication and Propagation through the Atmosphere and Oceans VII, Sep. 18, 2018. 9 pages.
Saathof, et al., "Optical Technologies for Terabit/s-throughput Feeder Link," IEEE International Conference on Space Optical Systems and Applications, Nov. 14, 2017. pp. 123-129.

* cited by examiner

MULTI-APERTURE FREE-SPACE OPTICAL COMMUNICATIONS RECEIVER

FIELD OF THE INVENTION

The invention relates to free-space optical communications. In particular, though not exclusively, the invention relates to free-space optical methods of communicating with earth-orbiting satellites. The invention relates in particular to satellite to ground optical communications, and coherent satellite to ground communications and transportable/mobile optical ground terminals.

BACKGROUND

Free-space optical communication links can provide high data rates by exploiting the large amount of bandwidth available in the visible and infrared portion of the electromagnetic spectrum. There is significant and growing interest in this area to support the growing need for fast data transfer of users data. Low Earth Orbit (LEO) satellite-to-ground bidirectional links can typically employ incoherent intensity modulation with direct detection (e.g. with On Off Keying (OOK) modulation). In this case the optical receiver (photodetector) only responds to changes in the receiving signal optical power, and cannot extract any phase or frequency information from the optical carrier. Typically a receiver telescope is used to at the ground station, to collect the optical signal from the satellite. At signal transmission ranges employed for LEO (e.g. 2,000 km) it is sufficient to employ receiver telescopes with sufficient objective/aperture diameters (e.g. 60 mm) in order to collect sufficient optical signal without the need for adaptive optics to correct for atmospheric turbulence.

However, for optical communication from Geostationary Earth Orbit (GEO) satellites, to a ground station, the signal transmission range is significantly larger (e.g. 38,000 km), and larger telescope objective/aperture diameters are required in order to collect enough optical signal. However, the larger the telescope objective/aperture diameter becomes, the more likely it is that atmospheric turbulence will distort the wavefront of received light to adversely affect coupling efficiency in to single-mode optical fibres or phase-matching for demodulation at the ground station. This is especially the case if coherent detection is being employed at the ground station telescope. Coherent detection provides improved signal to noise ratios (and thus receiver sensitivity), and can offer higher transmission data rates. However, the optical coherence requirements (e.g. for Binary Phase Shift Keying (BPSK) etc.) make it more susceptible to distorted wavefronts.

One way to increasing collection efficiency in ground station telescopes is to increase the telescope objective/aperture diameter. However, optical telescopes with apertures larger than about 0.5 metres are expensive. Furthermore, atmospheric turbulence adds to the difficulty of coupling light from large telescopes on to a small optical receiver/detector at the ground station, or the typically small-aperture optical input port (e.g. optical fibre end) of the optical receiver. Typically, the larger the aperture, the larger is the deviation, along the wavefront, from being flat enough for efficient use in coherent detection. Complex and expensive adaptive optics might mitigate these effects but that would be expensive if it is to be effective for a larger aperture telescope (e.g. 0.5 m or more). Using a small aperture telescope to address this problem comes at the cost of lower signal collection efficiency.

The invention aims to provide an improved technique for free-space optical communications.

BRIEF DESCRIPTION

In a first aspect, the invention provides a multi-aperture free-space optical communications receiver comprising a plurality of telescopes each having a clear objective aperture with a diameter between 50 mm and 250 mm and arranged for receiving light collectively from an optical communications light source. Each said telescope is separately arranged in association with:
  a respective wavefront detector to determine a wavefront of said received light directed to it by the respective telescope;
  a respective steerable reflector unit including a deformable mirror controllable to deform according to said determined wavefront such that said received light is reflected by the deformable mirror with a modified wavefront; and,
  a respective optical signal receiver for generating receiver signals in response to received optical signals and comprising an optical fibre wherein the steerable reflector unit is steerable to input said received light with said modified wavefront into said optical fibre for reception by the optical signal receiver.

The optical communications receiver further comprises a coherent combiner unit arranged to receive a plurality of receiver signals simultaneously from said plurality of optical signal receivers and to coherently combine said plurality of receiver signals to produce a combined signal therewith.

This provides a means for mitigating atmospheric effects for optical communications while maintaining sufficient signal collection efficiency. The coherent combiner unit may be arranged to perform optical coherent combining. This may use analogue approaches to coherent combining including optical phase-locked loops (OPLL) and fibre variable phase delays, such as would be readily apparent and available to the person of ordinary skill in the art.

The coherent combiner unit may be arranged to perform coherent combining implemented digitally by using digital coherent receivers and digital signal processing (DSP). For example, the optical receivers may convert optical received signals into digital signals for input to the coherent combiner. This eliminates the need for OPLLs and optical phase shift hardware for phase alignment. The multiple telescope apertures may each receive the same optical communications signal (e.g. via the laser beam of a communications satellite) simultaneously, and each of those simultaneous versions of the optical signal have each suffered independent intensity and phase variations caused by atmospheric turbulence along its optical path from the satellite to the receiver.

The optical signal receivers may pre-amplify the received signals by passing them through a respective one of an array of parallel optical fibre amplifiers (e.g. an erbium-doped fibre amplifier, EDFA). The optical signal receivers may be coherent optical receivers that share a common local oscillator (LO) for applying to received optical signals to generate in-phase (I) and quadrature-phase (Q) components thereof. Each optical fibre amplifier may be optically in communication, at its output end, with a respective coherent receiver of a plurality of coherent receivers that all share a common local oscillator (LO). The fibre amplifiers may provide desirable gain to low power received optical signals. The fibre amplifiers may provide a total signal gain of between 50 dB and 100 dB (e.g. ~70 dB). Optical amplification helps ensure that there is sufficient optical power to overcome signal losses from components later in the receiver signal path, as well as being more robust to the thermal noise of photodetectors used to convert optical signals into electrical signals.

Each coherent receiver may be arranged to determine the in-phase (I) and quadrature-phase (Q) components of received light, and to output the result as an in-phase signal and a quadrature-phase signal, which are input to a digital signal processor of the coherent combiner unit arranged to digitise them (if in analogue form) or are digitised by the respective coherent receiver for delivering to the coherent combiner unit in digital form. The digitised in-phase (I) signals from each of the plurality of telescopes may be temporally aligned by the digital signal processor of the coherent combiner unit so as to collectively correspond to (i.e. look like they all derive from) a common, coherent optical wavefront. Similarly, the quadrature-phase (Q) signal from each of the plurality of telescopes may be temporally aligned by the digital signal processor so as to collectively correspond to (i.e. look like they all derive from) a common, coherent optical wavefront. The digital signal processor may be arranged to digitally superpose the temporally aligned in-phase (I) signals in to one coherently combined in-phase (I) signal component. The digital signal processor may be arranged to digitally superpose the temporally aligned quadrature-phase (Q) signals in to one coherently combined quadrature-phase (Q) signal component. Demodulation of the digital received signal may be performed using these two coherently combined components.

The digital signal processor may be arranged to combine the coherently combined quadrature-phase (Q) signal component and the coherently combined in-phase (I) signal component in to one coherently combined full signal, if desired. In this way, a multi-telescope digital coherent combining receiver may be implemented that combines multiple inputs to produce a single output signal. The digital coherent combiner may use suitable existing integrated photonics and integrated electronics for implementing the required signal processing in real-time.

The communications receiver may comprise a signal detector/decoder unit arranged to receive the combined signal (e.g. the combine full signal or the I and Q signal components) from the coherent combiner unit, and to determine (e.g. demodulate) a digital communication conveyed thereby.

Desirably, the plurality of telescopes comprises no more than twenty (20) telescopes, or more preferably from three (3) to fifteen (15) telescopes, or even more preferably from four (4) to ten (10) telescopes, or yet more preferably from five (5) to eight (8) telescopes.

Desirably, each respective deformable mirror comprises a bimorph deformable mirror (e.g. zonal bimorph deformable mirror). As an example, a typical bimorph mirror is formed by combining two or more layers of different materials, one of which comprises a piezoelectric or electro-strictive material. Electrodes are patterned on the piezoelectric or electro-strictive layer to permit local ('zonal') deformations controllably. The mirror is deformed when a voltage is applied selectively to one or more of the electrodes, which causes the electrode to extend laterally. This has the effect of causing a local mirror curvature. Other types of deformable mirrors may be used such as segmented mirrors formed from a plurality of independent flat mirror segments collectively defining the overall mirror surface.

Desirably, each respective wavefront detector comprises a Shack-Hartmann wavefront detector for determining said wavefront of received light. Desirably, the wavefront detector is arranged to control the deformation of the deformable mirror to achieve a shape which corresponds to (or approximates) substantially the shape of the phase conjugate of the received wavefront shape.

Desirably, each respective deformable mirror is controllable to tilt and/or tip so as to steer the direction of said reflected light into the respective optical fibre. It is to be understood that the tip and/or tilt motion of the deformable mirror is separate from the movement of the mirror surface required to effect deformation of the mirror. Desirably, the stroke of actuators provided to implement the tip and/or tilt motion is greater than the stroke/movement of the mirror surface required to effect deformation of the mirror.

Desirably, each respective steerable reflector unit comprises a plurality of actuators operable to adjustably tilt and/or tip the respective deformable mirror.

Desirably, said respective deformable mirror comprises a plurality of apertures in the reflective surface thereof, wherein each aperture is in optical communication with the respective wavefront detector for receiving said received light transmitted through a said aperture(s).

Desirably, each respective deformable mirror is tiltable and/or tippable relative to the respective wavefront detector. This enables the wavefront detector to remain un-tipped/tilted relative to an incoming wavefront when to mirror is tipped or tilted to steer the reflected (modified) wavefront to an optical signal receiver input port.

Desirably, the coherent combiner is operable to coherently combine receiver signals received by the plurality of optical receivers collectively, by aligning the optical phases of the receiver signals thereby to produce a coherently combined signal.

Desirably, the optical fibre is a single-mode optical fibre.

Desirably, one or more of said telescopes is arranged in association with an optical signal transmitter arranged in optical communication with said steerable reflector unit of the respective telescope and arranged to transmit an optical communications signal from the respective telescope by reflection from the deformable mirror of the steerable reflector unit.

In a second aspect, the invention provides a method for receiving a free-space optical communications signal, comprising providing a plurality of telescopes each having a clear objective aperture with a diameter between 50 mm and 250 mm and arranged for receiving light collectively from an optical communications light source, and providing a plurality of deformable mirrors each arranged in association with a respective one of said telescopes. The method includes, separately in respect of each said telescope:
  determining a respective wavefront of said light received by the telescope;
  deforming the respective deformable mirror according to said determined wavefront such that said received light is reflected by the deformable mirror with a modified wavefront;
  reflecting said received light with said modified wavefront towards an optical signal receiver comprising an optical fibre wherein the reflecting inputs said received light into said optical fibre for reception by the optical signal receiver;
  by the optical signal receiver, generating receiver signals in response to received optical signals;

The method further includes providing a coherent combiner unit and therewith receiving a plurality of receiver signals simultaneously from said plurality of optical signal receivers and coherently combining said plurality of receiver signals to produce a combined signal therewith. The method may include detecting/decoding the combined signal to determine a digital communication conveyed thereby.

The method may include tilting and/or tipping a respective deformable mirror so as to steer the direction of said reflected light into the respective optical fibre.

The method may include coherently combining receiver signals received by the plurality of optical receivers collectively, by aligning the optical phases of the receiver signals thereby to produce a coherently combined signal.

In a further aspect, the invention provides a method for transceiving free-space optical communications signals including receiving a free-space optical communications signal according to the method of receiving described above, and in association with one or more of said telescopes: providing an optical signal transmitter arranged in optical communication with the deformable mirror of the respective telescope and, transmitting an optical communications signal from the respective telescope by reflection from the deformable mirror.

DETAILED DESCRIPTION

Figure 1:
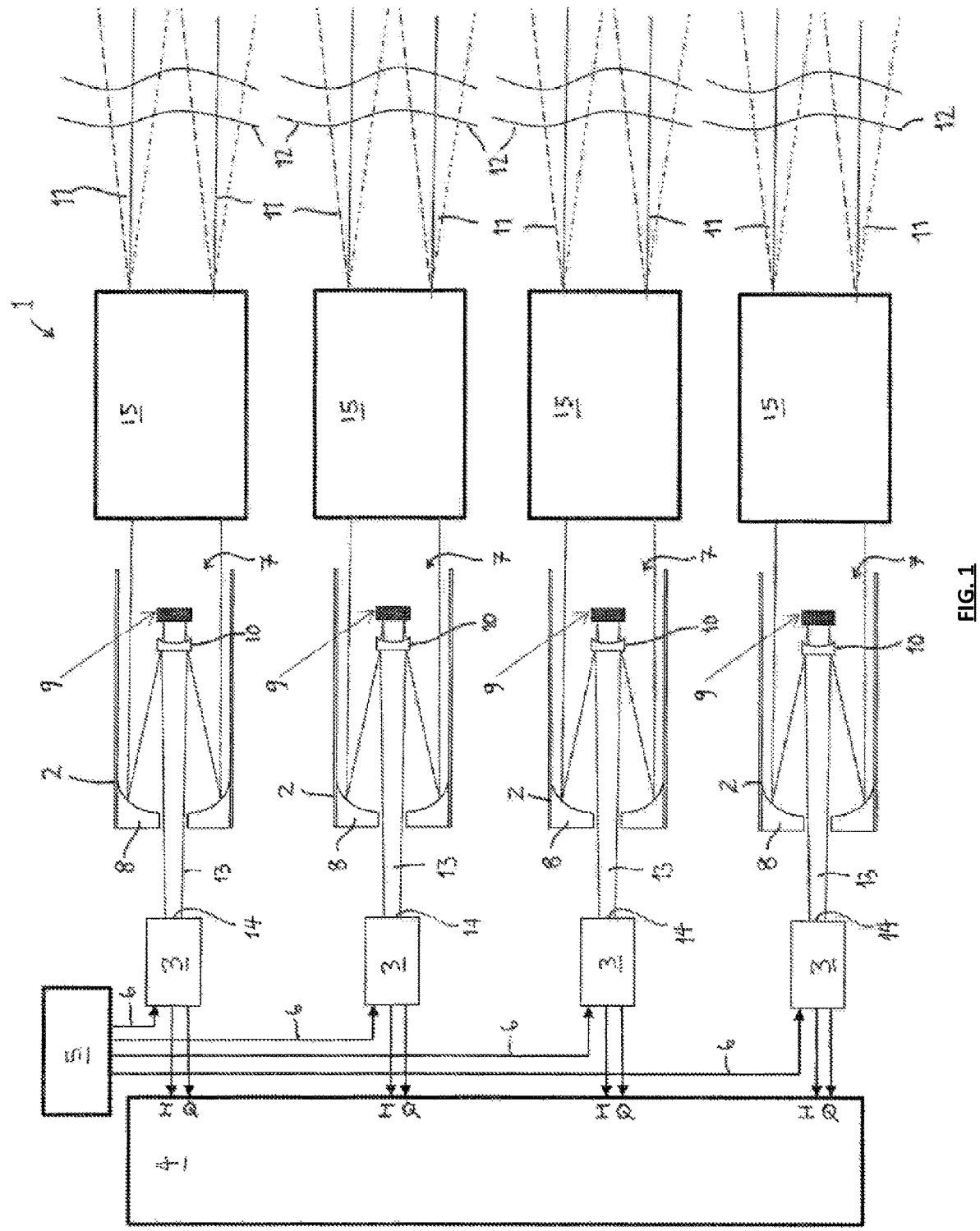
FIG. 1 schematically shows a multi-aperture free-space optical communications receiver according to an embodiment of the invention.

In the drawings, like items are assigned like reference symbols.

FIG. 1 illustrates schematically, a multi-aperture free-space optical communications receiver (1) comprising multiple Cassegrain optical reflecting telescopes (2) each having a clear objective aperture (7) of 100 mm and arranged collectively with their optical axes in parallel and pointing in a common direction.

Four such telescopes are shown in FIG. 1, for clarity, however, the receiver may comprise six such telescopes in full (i.e. the other two are not shown, merely to aid clarity). The total number of telescopes could be other than six, if desired. If more telescopes are used, then the objective aperture of each may be less than 100 mm. If fewer than six telescopes are used, then the objective aperture of each may me greater than 100 mm. It is to be understood that the term "Cassegrain" used herein in relation to reflecting telescopes, is intended to refer to Cassegrain-type telescopes which possess a focal point commonly termed a "Cassegrain focus". This is a focal point located behind the primary mirror of the telescope and is accessible by light passing from within the telescope through a hole in the centre of the primary mirror. The "classic" Cassegrain telescope has a parabolic-shaped primary mirror and a hyperbolic-shaped secondary mirror arranged to reflect incident light through a hole in the primary to the "Cassegrain focus". However, the present use of the term "Cassegrain" is not intended to be limited to this specific combination of mirror curvatures/shapes, or secondary mirror curvature/shape. Indeed, other well-known examples of Cassegrain telescopes which are also not limited to the specific combination of mirror curvatures/shapes used in a "classic" Cassegrain telescope design, include: Ritchey-Chrétien Cassegrain telescopes, Dall-Kirkham Cassegrain telescopes, Schmidt-Cassegrain telescopes, Maksutov-Cassegrain telescopes, Argunov-Cassegrain telescopes and Klevtsov-Cassegrain telescopes. Indeed, in other embodiments (not shown), the telescope may be other than a Cassegrain telescope, such as a refracting telescope.

These telescopes are arranged to collectively receive the light (11) of an optical communication signal (e.g. a laser beam) emanating from an earth-orbiting communication satellite (not shown). The light of the optical communication signal is shown as possessing a distorted (i.e. not flat) optical wavefront (12) which has resulted from transmission of the light signal through the Earth's atmosphere. Random variations in atmospheric refractive index distorts an initially undistorted wavefront into a significantly distorted wavefront (12). The optical communications receiver (1) is arranged to correct such distortions and return the distorted, received wavefront (12) into a plurality of substantially undistorted (or at least significantly less distorted) optical wavefronts, and to generate a final signal by combining the plurality of substantially undistorted wavefronts.

Each telescope (2) of the optical communications receiver is separately arranged in association with the following components of its own along an optical train/path: a wavefront detector (9) with which to determine the wavefront (12) of received light, and which also includes a steerable deformable mirror for modifying/correcting the non-flat wavefront (12) to render it less distorted (e.g. more flat); and an optical signal receiver (3) for receiving the corrected wavefront and for generating receiver signals for output to a common coherent combiner unit (4) shared by all of the telescopes.

Each of the Cassegrain telescopes (2) comprises a concave primary mirror (8) in optical communication with the objective aperture (7) of the telescope, for receiving light entering the telescope through the objective aperture and for reflecting that light to converge towards a deformable and steerable secondary mirror (9) of the telescope, via a diverging lens lenses (10) which serves to reduce the angle of convergence/incidence with which light from the primary mirror reaches the reflecting surface of the deformable, steerable secondary mirror. Thus, the diverging lens (10) removes most of the curvature imposed upon the reflected optical wavefront by the curvature of the reflecting surface of the primary mirror (8) thereby returning the curvature/shape of the optical wavefront that is delivered to the secondary mirror (9) to be more closely approximating that of the wavefront (12) initially received by the telescope at its objective aperture (7). Controllable deformation of the deformable mirror may then be substantially dedicated to correcting for atmospherically induced random wavefront distortions in the received wavefront, as opposed to distortions induced systematically by the secondary mirror curvature.

The optical receiver (3) comprises an optical input port (14) at which an end of a single-mode optical fibre is presented for receiving light (13) reflected from the secondary mirror (9) for subsequent signal processing. The diameter of the input end of the single mode optical fibre is about 7 µm, and the secondary mirror is controllable to tip and tilt in such a way as to steer the direction of the beam of light (13) reflected from it, such that the beam efficiently enters the single-mode optical fibre for optical transmission along the fibre for processing.

Each optical receiver (3) of the six optical receivers of the communications receiver (1) is a coherent optical receiver in the sense that each is supplied with a local oscillator (LO) signal (6) from a common local oscillator (5), and this common local oscillator signal is used by each of the six coherent optical receivers to process respective received optical signals (13) coherently. Methods of coherent detection such as would be readily available and apparent to the skilled person in the art, may be used for this purpose.

In brief, a received optical signal comprises a modulated optical carrier signal (frequency=$f_c$), and the process of coherent detection decomposes this signal into 'in-phase' (l(t)) and 'quadrature-phase' (Q(t)) components as:

$$\text{Signal}(t) = I(t) \cdot \cos(2\pi f_c t) + Q(t) \cdot \sin(2\pi f_c t)$$

An IQ demodulator then mixes the received modulated carrier with a continuous wave (CW) local oscillator (LO, item 5), signal (6) with frequency $f_{LO}$, and a 90-degree shifted version of the LO—i.e. with $\cos(2\pi f_{LO})$ and $-\sin(2\pi f_{LO})$. If $f_{LO} = f_c$, the signal is down-converted from the carrier frequency down to baseband, and the in-phase and quadrature-phase components are be recovered. In this way one may obtain the complex envelope (and therefore, the data) of a modulated optical carrier. After detection of the outputs in balanced photodiodes, the in-phase and quadrature-phase components of the data signal (referenced to the CW local oscillator) are recovered.

The optical communications receiver (1) includes a coherent combiner digital signal processor (4) for receiving the in-phase and quadrature-phase signal components from each of the coherent receiver units (3). The coherent combiner is arranged to coherently combine the received signal components and to coherently combine them into one signal. This combined signal may then be passed to a demodulator (not shown) which may be configured for demodulating the combined signal passed to it by the coherent combiner. For example, the received optical signal (11) may have been modulated using optical quadrature phase-shift keying (QPSK) which the demodulator may then de-modulate accordingly.

The coherent combiner unit includes a digital signal processor (DSP) arranged to perform coherent combining digitally in this way. The coherent combiner unit includes a plurality of analogue-to-digital converters (ADC) each for receiving a respective one of the in-phase and quadrature-phase signals from the coherent receivers (3) in analogue form, and converting those analogue signals into digital signals for subsequent processing by the digital signal processor.

Each coherent receiver unit (3) pre-amplifies the optical signal received by it by passing them through an erbium-doped fibre amplifier (EDFA) located within the coherent receiver in optical communication with the single-mode optical fibre that provides the optical input port of the receiver. The fibre amplifier provides gain to the received optical signals, e.g. ~70 dB. This gain helps ensure that the optical signals within the receiver have sufficient power to overcome later losses from components in the signal path.

The digital signal processor is arranged to temporally align and phase align the in-phase signals and quadrature-phase signals input to it, and then to digitally superpose the respective temporally aligned and phase aligned signals in to one coherently combined signal component. In doing so, the digital signal processor combines the coherently-combined quadrature-phase signal component and the coherently-combined in-phase signal component in to one coherently-combined full signal. This full signal may then be de-modulated to recover a communications signal data it is modulated with. The digital coherent comber may use suitable existing integrated photonics to and integrated electronics for implementing the required signal processing in real-time. It is to be understood that these methods of coherent combining and signal processing are as would be readily understood by, and available to, the person of ordinary skill in the art. Other existing coherent combining methods may be used.

The primary function of the array of telescopes (2) and coherent receivers (3) is to collect sufficient usable signal light to close the communication link with the data-transmitting earth-orbiting satellite, and efficiently deliver that light to the de-modulator (not shown). In particular, the architecture in FIG. 1 relies on coupling light from each telescope into a single-mode optical fibre of a coherent receiver unit (3). Efficient coupling of that light into the single-mode fibres of the receivers is achieved using adaptive optics (AO) to compensate for the time-varying atmospheric spatial phase variations across the diameters of the respective telescopes.

Multi-aperture coherent combining uses many discrete apertures together to create a large effective aperture. A critical step in the combining process is phase alignment of the different received signals.

Estimating the relative phases of the different signals comprises computing the vector 'dot product' between pairs of signals. Coherently combining signals ($S_1, S_2, S_3, \ldots S_N$), where $S_i$ is the complex phasor from the optical signal from the $i^{th}$ telescope, employs the steps of:

(1) determining the relative phase between the N different signals;
(2) starting with one reference signal, coherently combining each subsequent signal with a running coherent sum of all previous signals.

For example, if $S_1$ is used as a reference signal (the one with the greatest signal-to-noise ratio), and $\theta_i$ is the absolute phase of the $i^{th}$ signal, then the relative phases of the other signals are $\phi_2, \phi_3, \phi_4 \ldots \phi_N$, where $\phi_i = \theta_i - \theta_1$. The method is to compute a complex dot product between pairs of these signals, as follows:

$$X_i = X_{i-1} + S_i \exp\{-j\phi_i\}; \text{ where } i=1,3,4,\ldots N$$

starting with one signal and coherently combining each subsequent signal with a running coherent sum of all previous signals. Here, $X_1 = S_1$ and $\phi_i = \arg\{[S_i, X_{i-1}]\}$ where:

$$[S_i, X_{i-1}] = \Sigma(S_i)_m \cdot (X_{i-1})^*_m$$

represents the complex dot-product between the pairs of signals $S_i$ and $X_{i-1}$ where each of the signals in that pair is composed of M (integer) in-phase and quadrature-phase samples. Here, the symbol '*' represents complex conjugation, and the symbol 'Σ' represents summing over the counting integer m from m=1 to m=M.

In the example shown in FIG. 1, a typical Fried parameter ($r_0$) of 2.0 cm 'seeing' is assumed to be representative of seeing conditions in normal use. Each telescope (2) includes a deformable mirror with tip-tilt steering capability. Each telescope is shown as also be fitted with a coarse-pointing assembly (CPA, item 15) to allow independent acquisition and tracking of a transmitting earth-orbiting optical communication satellite. A CPA of any suitable type such as is readily apparent and available to the skilled person may be used for this purpose, or in alternative embodiments may be omitted altogether.

Figure 2:
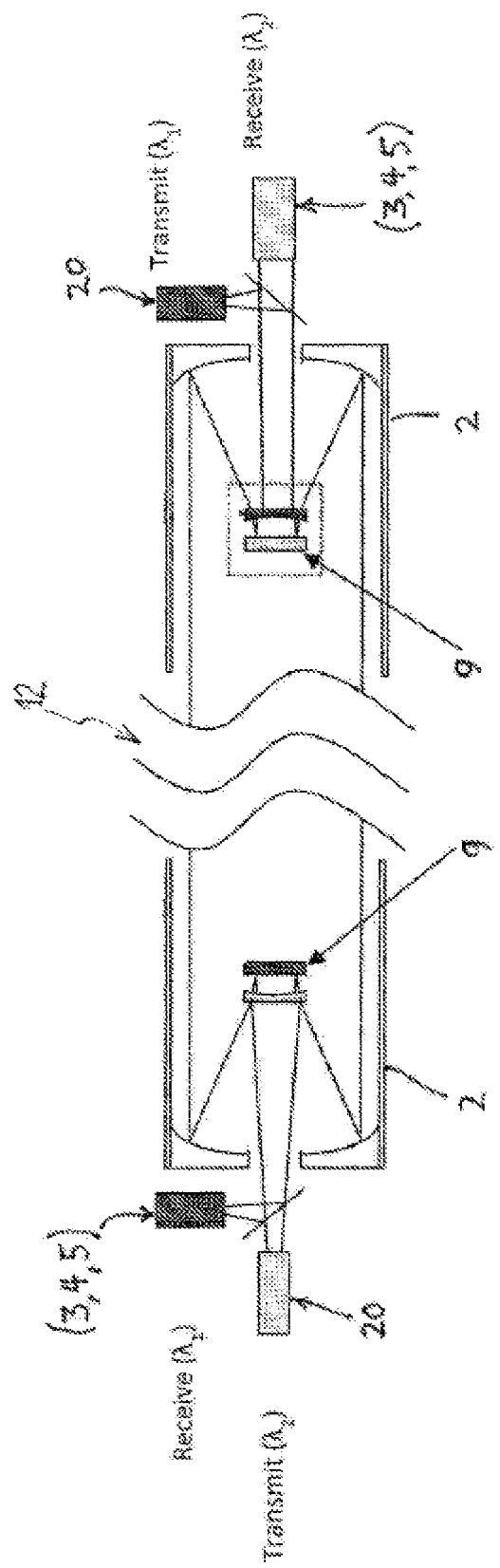
FIG. 2 schematically shows a pair of multi-aperture free-space optical communications transceivers each comprising the receiver according to FIG. 1 and a transmitter of optical communications.

FIG. 2 schematically illustrates a modification applicable to some or each of the telescopes (2) employed in the optical communications receiver of FIG. 1, which permits the communications receiver to function as a transmitter as well. That is to say, the transmitter may be modified to become a transceiver. To achieve this, an optical signal transmitter (20—left hand side of FIG. 2) is provided in association with a respective telescope (2). The optical signal transmitter is arranged to transmit optical signals of a second wavelength ($\lambda_2$) which is other than a first wavelength ($\lambda_1$) of received optical signals. A wavelength-selective mirror is placed in the optical transmission path of the optical transmitter (20) and simultaneously in the optical path of the wavefront-corrected signal beam (13). Received signal light of a first wavelength ($\lambda_1$) is reflected from the wavelength-selective mirror to the coherent optical receiver and coherent combiner assembly (3, 4, 5) for subsequent demodulation, whereas light of a second wavelength ($\lambda_2$) is transmitted through the same wavelength-selective mirror for outward transmission by the telescope (2). In this way, optical signals for transmission may be processed and transmitted independently of optical signals for reception. This method of passing outgoing optical signals through the wavelength-selective mirror while reflecting incoming optical signals from it, may be reversed in the telescopes of a corresponding multi-aperture free-space optical communications transceiver (20—right hand side of FIG. 2), as shown schematically in FIG. 2 whereby outgoing optical signals are reflected from the wavelength-selective mirror while incoming optical signals pass through it.

Figure 3:
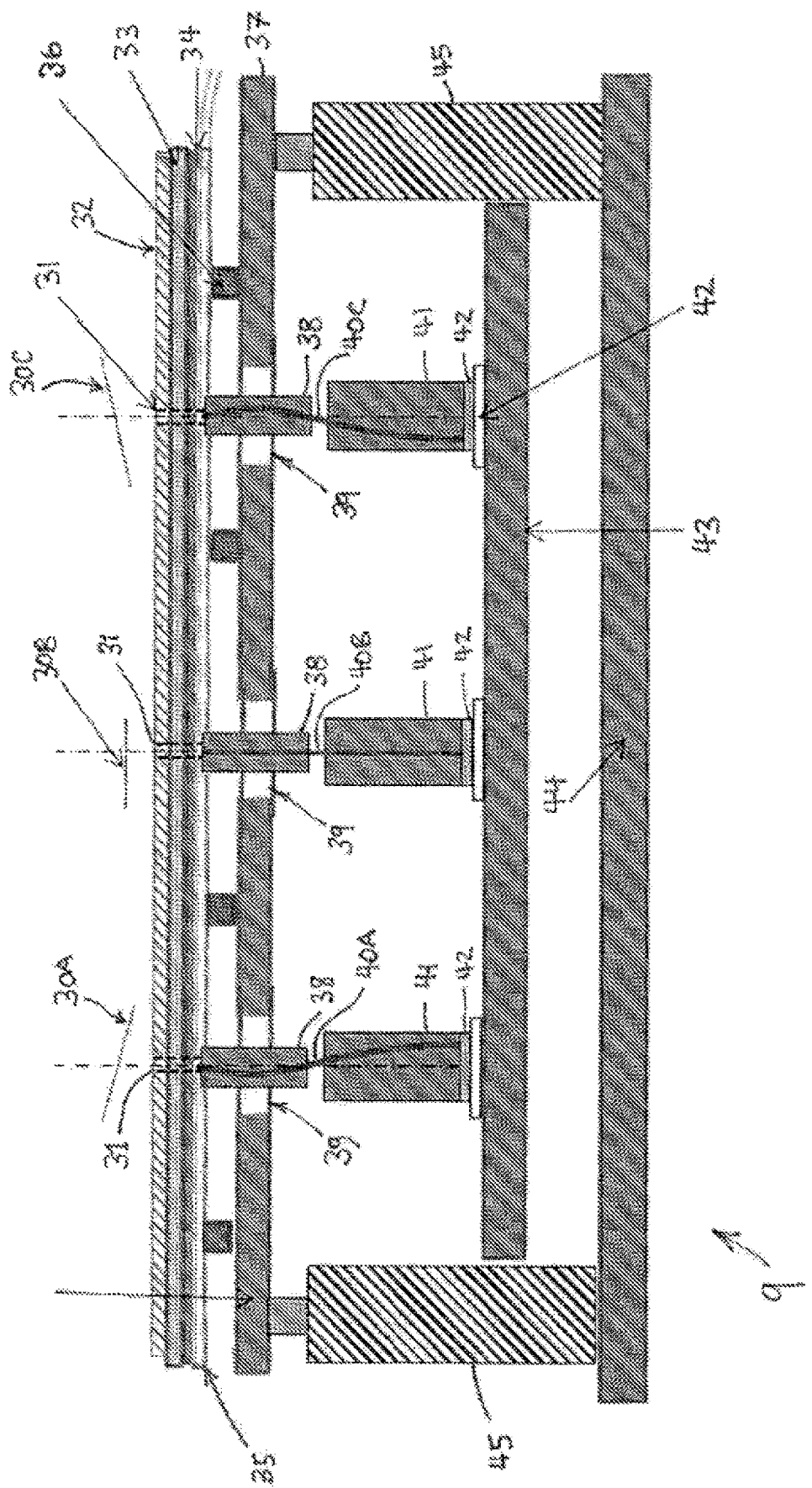
FIG. 3 schematically shows in cross-section an example of a combined steerable reflector unit comprising a deformable mirror and a wavefront detector for controlling the deformable mirror.

FIG. 3 schematically illustrates a steerable, deformable mirror (9) assembly suitable for use in any or each of the telescopes (2) of the multi-aperture free-space optical communications receiver (1). The schematic diagram of FIG. 3 shows the depormable mirror as being substantially flat, however, it is to be understood that the reflective surface of the deformable mirror may present a convex curvature, as desired or appropriate, so as to assist in bringing to a focus (i.e. at the Cassegrain focus of the telescope), light that is incident upon it from the primary mirror of the telescope. The deformable mirror takes the form of a zonal bimorph deformable mirror (ZBDM) comprising tip-tilt actuators (45) controllable to steer the direction of light reflected from the reflective surface (32) of the deformable mirror, towards the optical input port (single-mode optical fibre) of a respective coherent optical receiver (3), as desired.

The steerable, deformable mirror (9) assembly comprises a deformable reflective uppermost surface (32) within which are formed a regularly spaced array of through-opening apertures is (31) enabling optical communication with a Shack-Hartman wavefront detector (43) of the assembly. While the deformable mirror is deformable to modify the wavefront of light reflected by it, the Shack-Hartman wavefront detector allows integrated detection of the shape of the incident wavefront (30A, 30B, 30C) and, to determine the nature of deformation of the mirror depending on the detected shape of the incident wavefront. The Shack-Hartman wavefront detector is mechanically connected to an underside of a support chassis (37) to which the deformable mirror is also connected, at the chassis upper side. Tip-tilt actuators (45) are mounted upon a support base (44) and are mechanically coupled to the support chassis which is disposed above the support base and is generally parallel thereto. The tip-tilt actuators are controllable to tip and/or tilt the support chassis to adjustably control the orientation of the support chassis so as to point the reflective surface of the deformable mirror in a suitable direction for directing reflected light (13) into the optical input port of a respective optical receiver (3).

The optically reflective surface (32) is disposed upon the upper surface of an underlying transparent passive substrate (33) which is itself is disposed upon an upper surface of a Piezo-electric layer (34). In turn, the Piezo-electric layer is disposed upon an upper surface of a flexible electrical circuit (35) and is electrically coupled to the flexible electrical circuit for receiving electrical signals from the circuit and responding to the signals by deforming Piezo-electrically. Electrically-induced deformation of the Piezo-electric layer (34) is mechanically transmitted to the deformable reflective surface (32), via the intermediate transparent passive substrate (33), so as to effect the necessary and desired deformation of the uppermost reflecting surface of the deformable mirror.

Complaint support pillars (36) are disposed at regular intervals between the underside of the flexible electrical circuit (35) and the upper side of the support chassis (37), and mechanically couple the former to the latter. The optical through-openings (31) formed in the reflective layer (32) also pass through the underlying piezoelectric layer (34) and the underlying flexible electrical circuit layer (35). The transparent passive substrate (33), in being optically transparent, does not require such two-openings. In alternative arrangements the Piezo-electrical layer may be optically transparent and, therefore, not require optical through-openings. These optical through-openings, and the associated optical transparency of underlying layers, permit optical communication between the uppermost reflective surface (32) of the deformable mirror, and a pair of graded-refractive index (GRIN) lenses (38, 41) forming part of the Shack-Hartman wavefront detector.

The Shack-Hartman wavefront detector (43) comprises an array of separate photodetectors (42) each possessing an extended photo-sensitive area arranged in register with the optical through-openings (31) formed in the deformable mirror parts (32, 33, 34, 35), so as to be in optical communication therewith. Each photodetector has aligned above it a respective pair of GRIN lenses which receive light which is passed through the optical through-openings in the deformable mirror parts, and focus that light upon the respective photodetector surface. Each photodetector is arranged to detect the position, upon the photo-sensitive area thereof, at which received light is received.

The pair of GRIN lenses comprises a first lens (38) which passes through a through-opening (39) formed within the support chassis (37), and is supported by the support chassis to place the optical axis of that lens in register with, and passing through, the optical through-opening (31) passing through the mirror parts. A second lens (41) of the pair of lenses is mounted upon the photo-sensitive surface of the respective photodetector (42) and in turn has an optical axis which is aligned coaxially with the optical axis of the first lens. The trajectory (40C) of an optical wavefront portion (30C) which is transmitted through the optical through-opening (31) is focused upon a region of the photo-sensitive surface of a respective photodetector according to the direction of propagation of that wavefront when it reached the optical through-opening in question, and therefore the orientation of the wavefront portion relative to the reflective uppermost surface of the deformable mirror. As is shown schematically in FIG. 3, a first wavefront portion (30A) is focused upon a right-most surface part of a respective photodetector surface (42), whereas a second wavefront portion (30B) is focused upon a middle surface part of a respective photodetector surface, and yet a third wavefront portion (30C) is focused upon a left-most surface part of a respective photodetector surface. These differences in focal position correlate directly with associated differences in orientation of the wavefront parts relative to the deformable mirror reflective surface (32).

The Shack-Hartman wavefront detector (43) includes a signal processor (not shown) arranged to determine the shape of the wavefront (30) via this detection of the orientation of the wavefront parts (30A, 30B, 30C), and to determine electrical signals to supply to the flexible electrical circuit (35) with which to Piezo electrically deformed the piezoelectric layer (34) to achieve a deformation of the reflective surface of the deformable mirror (32) sufficient and necessary to impose a phase conjugated reflection of the incident wavefront (30). Techniques of signal processing to achieve this are readily apparent and available to the person of ordinary skill in the art, and will not be discussed in detail here.

Figure 5:
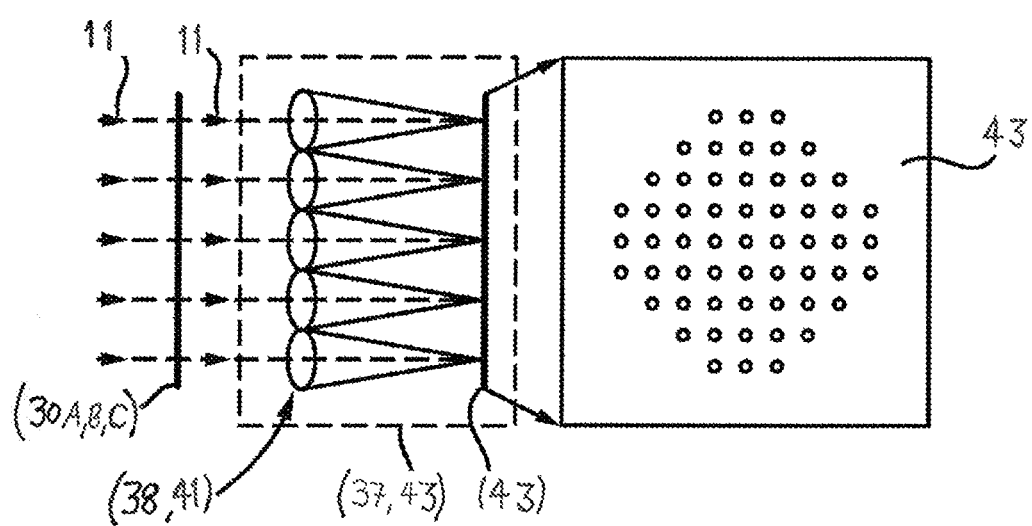
FIG. 5 schematically shows an example of a Shack-Hartman wavefront detector.

In general terms, the Shack-Hartman wavefront detector is shown in simplified schematic terms in FIG. 5 to illustrate the relationship between the focusing effect of the lenses and the resultant array of focal points achieved on the array of photodetectors. The schematic illustration of FIG. 5 shows the array of focal points as being regular and equally spaced. This result is achieved only when the incident wavefront (30A,B,C) is flat, as schematically illustrated in FIG. 5. However, when the incident wavefront is deformed from flatness, the result is that the regularity in the distribution of focal points (43) is similarly deformed. The Shack-Hartman wavefront detector determines the deformation of the incident wavefront using the corresponding deformation of the array of focal points.

Figure 4:
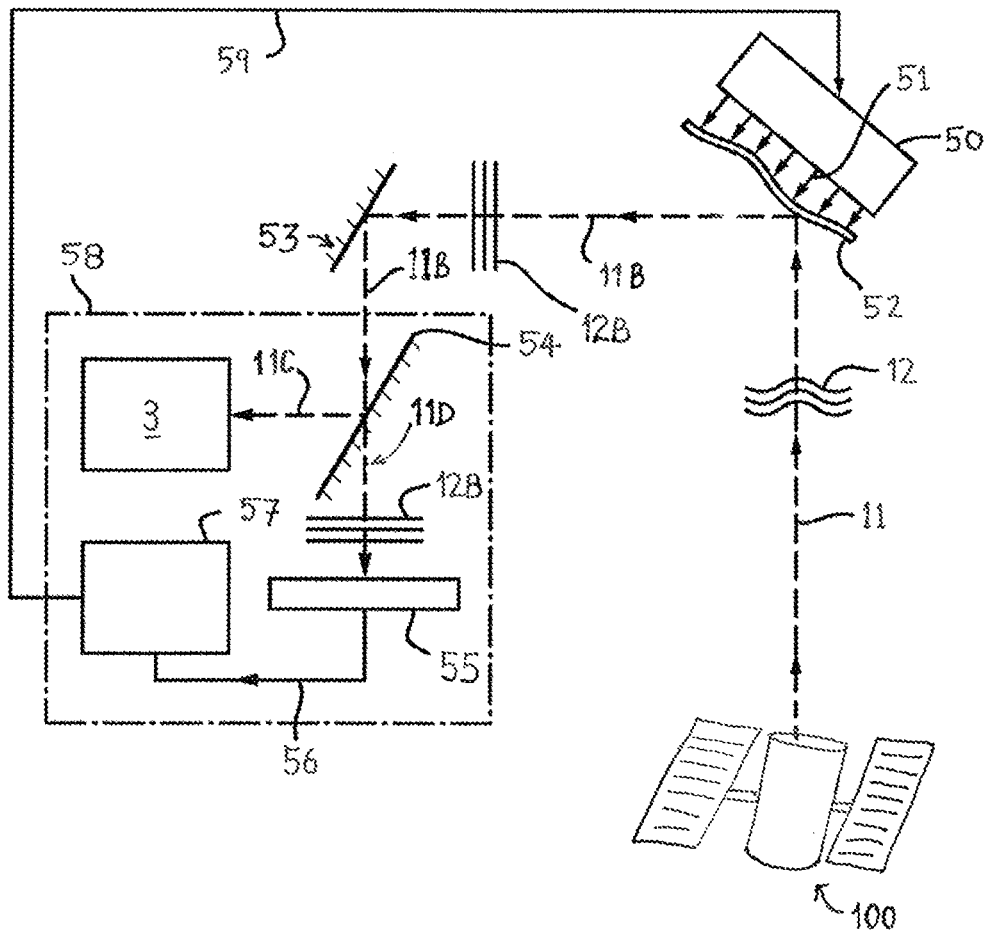
FIG. 4 schematically shows in cross-section an example of a steerable reflector unit comprising a deformable mirror and in optical communication with a separate wavefront detector for controlling the deformable mirror.

The integrated deformable mirror and Shack-Hartman wavefront detector assembly illustrated in FIG. 3 is one embodiment for implementing the secondary mirror (9) of each of the telescopes (2) of the multi-aperture free-space optical communications receiver. However, other arrangements are possible in which the Shack-Hartman wavefront detector is not directly integrated into the structure of the deformable mirror in this way. An example of this is schematically illustrated in FIG. 4 which shows a tip/tilting deformable mirror assembly comprising a deformable mirror surface (52) deformable under action of deformation forces (51) transmitted to it by a deformable mirror control unit (50). The deformable mirror control unit applies deformation forces according to control signals (59) generated by a Shack-Hartman processor (57) which is arranged to receive electrical signals (56) generated by a photosensor array (55) comprising a photosensitive array of separate photodetector sensor surfaces. These photosensor surfaces may share the same structure and array pattern (43) as the photosensor surfaces (42) illustrated and described in connection with FIG. 3 and/or FIG. 5.

The photosensor array (55) of the Shack-Hartman wavefront detector (58) is optically coupled to the deformable mirror surface (52) via an intervening first mirror (53), and a subsequent intervening half-silvered mirror (54). Transmitted from an Earth-orbiting optical communication satellite (100), is an optical communication signal (11). When this transmitted optical signal is received at the multi-aperture free-space optical communications receiver (1), it carries a deformed wavefront (12) due to transmission through the Earth's atmosphere. This deformed wavefront is reflected (11B) from the deformable mirror surface (52) towards the first mirror (53) with a substantially flat wavefront (12B). The first mirror (53) directs the light to the second half-silvered mirror (54) whereat a greater portion (11C) of the light is reflected to the optical receiver (3) of the telescope in question (2), and a lesser part (11D) is transmitted (12B) to the photosensor array (55) of the Shack-Hartman wavefront detector (58). With that received light, the Shack-Hartman wavefront detector (58) is able to determine whether any deformation exists in the received wavefront, and to determine suitable signals (59) to transmit to the deformable mirror control unit (50) for use in generating appropriate deformation forces (51) for altering the deformation applied to the deformable mirror surface (52), as appropriate to maintain a substantially flat wavefront (12B) in the reflected light signal (11B).

Figure 6:
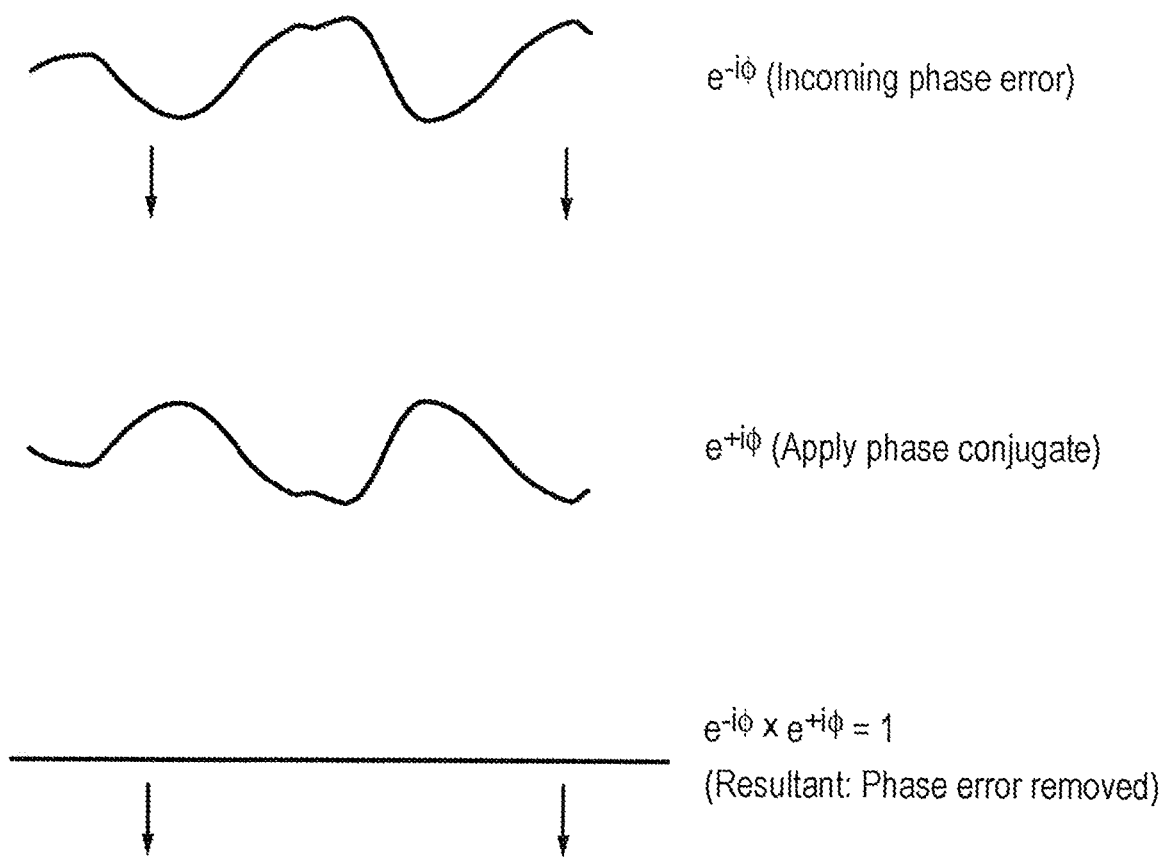
FIG. 6 schematically shows the process of applying phase conjugation to a deformed optical wavefront in order to remove phase error.

FIG. 6 schematically illustrates the effect of a suitable deformation in a reflecting deformable mirror surface for removing the phase errors present in the deformed wavefront of a received optical signal due to transmission through the Earth's atmosphere. An incoming deformed wavefront has an incoming phase error, and the deformation applied to the deformable mirror is such as to apply to a flat wavefront a phase error which is the phase conjugate of the incoming phase error. However, because the incoming wavefront is not flat, but has a specific phase error, the effect of applying the phase conjugate distortion to the incoming phase error is to remove the phase error entirely. The result is to achieve a substantially flat wavefront. While it is to be understood that it is an overall aim of phase conjugation and adaptive optics of this type, to achieve complete phase error removal wherever possible, it is to be understood that in practice the result is likely to be to achieve partial removal (to a greater or lesser extent) of phase error and to achieve an improvement in the "flatness" of the wavefront in question. Generally speaking, the more flat the resulting wavefront, the better, though it is not essential that the wavefront is perfectly flat.

The embodiments described herein are presented so as to allow a better understanding of the invention, and are not intended to limit the scope of the inventive concept of the invention. Variations, modifications and equivalents to the embodiments described herein, such as would be readily apparent to the skilled reader, are intended to be encompassed within the scope of the invention.

The invention claimed is:

1. A multi-aperture free-space optical communications receiver, comprising:
   a plurality of telescopes each having a clear objective aperture with a diameter between 50 mm and 250 mm and arranged for receiving light collectively from an optical communications light source;
   wherein each said telescope is separately arranged in association with:
      a respective wavefront detector to determine a wavefront of said received light directed to it by the respective telescope;
      a respective steerable reflector unit including a deformable mirror controllable to deform according to said determined wavefront such that said received light is reflected by the deformable mirror with a modified wavefront; and a respective optical signal receiver for generating receiver signals in response to received optical signals and comprising an optical fibre wherein the steerable reflector unit is steerable to input said received light with said modified wavefront into said optical fibre for reception by the optical signal receiver;

wherein the optical communications receiver further comprises a coherent combiner unit arranged to receive a plurality of receiver signals simultaneously from said plurality of optical signal receivers and to coherently combine said plurality of receiver signals to produce a combined signal therewith, and wherein at least one of the deformable mirrors comprises a reflective surface having a plurality of optical apertures extending through the reflective surface, wherein each aperture is in optical communication with the respective wavefront detector.

2. The multi-aperture free-space optical communications receiver according to claim 1, wherein the plurality of telescopes comprises no more than twenty (20) telescopes.

3. The multi-aperture free-space optical communications receiver according to claim 1, wherein each respective deformable mirror comprises a zonal bimorph deformable mirror.

4. The multi-aperture free-space optical communications receiver according to claim 1, wherein each respective wavefront detector comprises a Shack-Hartmann wavefront detector for determining said wavefront of received light.

5. The multi-aperture free-space optical communications receiver according to claim 1, wherein each respective deformable mirror is controllable to tilting and/or tipping so as to steer the direction of said reflected light into the respective optical fibre.

6. The multi-aperture free-space optical communications receiver according to claim 5, wherein each respective steerable reflector unit comprises a plurality of actuators operable to adjustably tilting and/or tipping the respective deformable mirror.

7. The multi-aperture free-space optical communications receiver according to claim 1, wherein each respective deformable mirror is tiltable and/or tippable relative to the respective wavefront detector.

8. The multi-aperture free-space optical communications receiver according to claim 1, wherein the coherent combiner is operable to coherently combine receiver signals received by the plurality of optical receivers collectively, by aligning the optical phases of the receiver signals thereby to produce a coherently combined signal.

9. The multi-aperture free-space optical communications receiver according to claim 1, wherein the optical fibre is a single-mode optical fibre.

10. The multi-aperture free-space optical communications receiver according to claim 1, in which one or more of said telescopes is arranged in association with an optical signal transmitter arranged in optical communication with said steerable reflector unit of the respective telescope and arranged to transmit an optical communications signal from the respective telescope by reflection from the deformable mirror of the steerable reflector unit.

11. A method for receiving a free-space optical communications signal using a multi-aperture free-space optical communications receiver, the receiver including a plurality of telescopes, a plurality of deformable mirrors, a plurality of optical signal receivers each comprising an optical fibre, and a coherent combiner unit, each telescope having a clear objective aperture with a diameter between 50 mm and 250 mm and arranged for receiving light collectively from an optical communications light source, each mirror arranged in association with a respective one of said telescopes, the method comprising:

separately in respect of each said telescope:
determining, using a wavefront detector, a respective wavefront of said light received by the telescope;
deforming the respective deformable mirror according to said determined wavefront such that said received light is reflected by the deformable mirror with a modified wavefront;
reflecting said received light with said modified wavefront towards the respective optical signal receiver, the reflecting inputting said received light into said respective optical fibre for reception by the respective optical signal receiver; and
generating, by the optical signal receiver, receiver signals in response to received optical signals; and
receiving, at the coherent combiner unit, a plurality of receiver signals simultaneously from said plurality of optical signal receivers and coherently combining said plurality of receiver signals to produce a combined signal therewith,
wherein at least one of the deformable mirrors comprises a reflective surface having a plurality of optical apertures extending through the reflective surface, wherein each aperture is in optical communication with the respective wavefront detector.

12. The method according to claim 11 including tilting and/or tipping a respective deformable mirror so as to steer the direction of said reflected light into the respective optical fibre.

13. The method according to claim 11, including coherently combining receiver signals received by the plurality of optical receivers collectively, by aligning the optical phases of the receiver signals thereby to produce a coherently combined signal.

14. A method for transceiving free-space optical communications signals including receiving a free-space optical communications signal according to claim 11, and in association with one or more of said telescopes:
transmitting, by an optical signal transmitter arranged in optical communication with the deformable mirror of the respective telescope, an optical communications signal from the respective telescope by reflection from the deformable mirror.

15. A multi-aperture free-space optical communications receiver, comprising:
a first telescope and a second telescope, each having a clear objective aperture with a diameter between 50 mm and 250 mm and arranged for receiving light collectively from an optical communications light source, wherein each said telescope is separately arranged in association with
a respective wavefront detector to determine a wavefront of said received light directed to it by the respective telescope,
a respective steerable reflector unit including a deformable mirror controllable to deform according to said determined wavefront such that said received light is reflected by the deformable mirror with a modified wavefront, and
a respective optical signal receiver for generating receiver signals in response to received optical signals and comprising a single-mode optical fibre wherein the steerable reflector unit is steerable to input said received light with said modified wavefront into said optical fibre for reception by the optical signal receiver;

a coherent combiner unit arranged to receive a plurality of receiver signals simultaneously from said plurality of optical signal receivers and to coherently combine said plurality of receiver signals to produce a combined signal therewith, wherein the coherent combiner is operable to coherently combine receiver signals received by the plurality of optical receivers collectively, by aligning the optical phases of the receiver signals thereby to produce a coherently combined signal, wherein at least one of the deformable mirrors comprises a reflective surface having a plurality of optical apertures extending through the reflective surface, wherein each aperture is in optical communication with the respective wavefront detector.

16. The multi-aperture free-space optical communications receiver according to claim 15, wherein each respective deformable mirror comprises a zonal bimorph deformable mirror, and each respective wavefront detector comprises a Shack-Hartmann wavefront detector for determining said wavefront of received light.

17. The multi-aperture free-space optical communications receiver according to claim 15, wherein each respective deformable mirror is controllable by one or more actuators so as to steer the direction of said reflected light into the respective optical fibre.

18. A free-space optical communications transceiver including the multi-aperture free-space optical communications receiver according to claim 15, and an optical signal transmitter arranged in optical communication with said steerable reflector unit of the respective telescope and arranged to transmit an optical communications signal from the respective telescope by reflection from the deformable mirror of the steerable reflector unit.

* * * * *